United States Patent
Chen et al.

(10) Patent No.: US 6,896,241 B2
(45) Date of Patent: May 24, 2005

(54) FAUCET WITH A DISCHARGE SPOUT SERVING AS A VALVE LEVER

(75) Inventors: Sung-Wu Chen, deceased, late of Nan-Tou Hsien (TW); by Hui-Lin Chen, legal representative, Nan-Tou Hsien (TW)

(73) Assignee: Hui-Lin Chen (TW)

( * ) Notice: Subject to any disclaimer, the term of this patent is extended or adjusted under 35 U.S.C. 154(b) by 0 days.

(21) Appl. No.: 10/675,309

(22) Filed: Sep. 29, 2003

(65) Prior Publication Data

US 2004/0169155 A1 Sep. 2, 2004

(30) Foreign Application Priority Data

Jun. 4, 2002 (TW) ...................................... 91208254 U

(51) Int. Cl.⁷ ............................................. F16K 31/00
(52) U.S. Cl. ...................................... 251/352; 137/801
(58) Field of Search .............................. 251/349, 350, 251/352; 137/801

(56) References Cited

U.S. PATENT DOCUMENTS

| | | | | |
|---|---|---|---|---|
| 985,223 A | * | 2/1911 | Swanberg | .................... 251/352 |
| 2,134,852 A | * | 11/1938 | Bogan | ......................... 251/352 |
| 3,380,478 A | * | 4/1968 | Garrison | ...................... 251/352 |
| 4,019,536 A | * | 4/1977 | Dong et al. | .................. 251/352 |
| 4,346,735 A | * | 8/1982 | Raz | .............................. 251/352 |
| 4,408,631 A | * | 10/1983 | Uhlig et al. | ................. 251/352 |
| 4,727,906 A | * | 3/1988 | Holzer | ........................ 251/352 |
| 4,750,645 A | * | 6/1988 | Wilson et al. | .............. 251/352 |
| 4,989,791 A | * | 2/1991 | Ridenour | ..................... 251/352 |

* cited by examiner

*Primary Examiner*—John Bastianelli
(74) *Attorney, Agent, or Firm*—Ostrolenk, Faber, Gerb & Soffen, LLP

(57) ABSTRACT

A faucet includes a valve tube journalled within a faucet body, and a discharge spout connected fixedly to an open end of the tube. A discharge end of the spout can be pushed upwardly to turn the spout from a discharging position, where an opening in the tube comes into alignment with a water inlet in the faucet body so that a maximum amount of water can flow downwardly from the discharge end, to a non-discharging position, where the opening is not fluidly communicated with the water inlet so as to stop flow of water from the discharge end. Because there is still water flowing from the discharge end when the spout is rotated from the discharging position to the non-discharging position, contamination of the user's hands due to contact with the discharge end after washing can be prevented.

7 Claims, 6 Drawing Sheets

FAUCET WITH A DISCHARGE SPOUT SERVING AS A VALVE LEVER

BACKGROUND OF THE INVENTION

1. Field of the Invention

This invention relates to a faucet, and more particularly to a faucet that includes a discharge spout, which serves as a valve lever.

2. Description of the Related Art

A rotary knob or a rotary lever is provided on a faucet for controlling supply or flow rate of water. Such a faucet has a disadvantage in that the user needs to rotate the knob or the lever in order to stop flow of water from the faucet after washing the hands of the user. When the user contacts and rotates the knob or the lever, his/her hands may become contaminated by dirt or bacteria on the knob or the lever.

SUMMARY OF THE INVENTION

The object of this invention is to provide a faucet, which can prevent contamination of the user's hands due to contact with the faucet after washing.

According to this invention, a faucet includes a valve tube journalled within a faucet body, and a discharge spout connected fixedly to an open end of the valve tube. A discharge end of the spout can be pushed upwardly to turn the spout from a discharging position, where an opening in the valve tube comes into alignment with a water inlet in the faucet body so that a maximum amount of water can flow downwardly from the discharge end, to a non-discharging position, where the opening is not fluidly communicated with the water inlet so as to stop flow of water from the discharge end. Because there is still some water flowing from the discharge end when the spout is rotated from the discharging position to the non-discharging position, contamination of the user's hands due to contact with the discharge end can be prevented.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
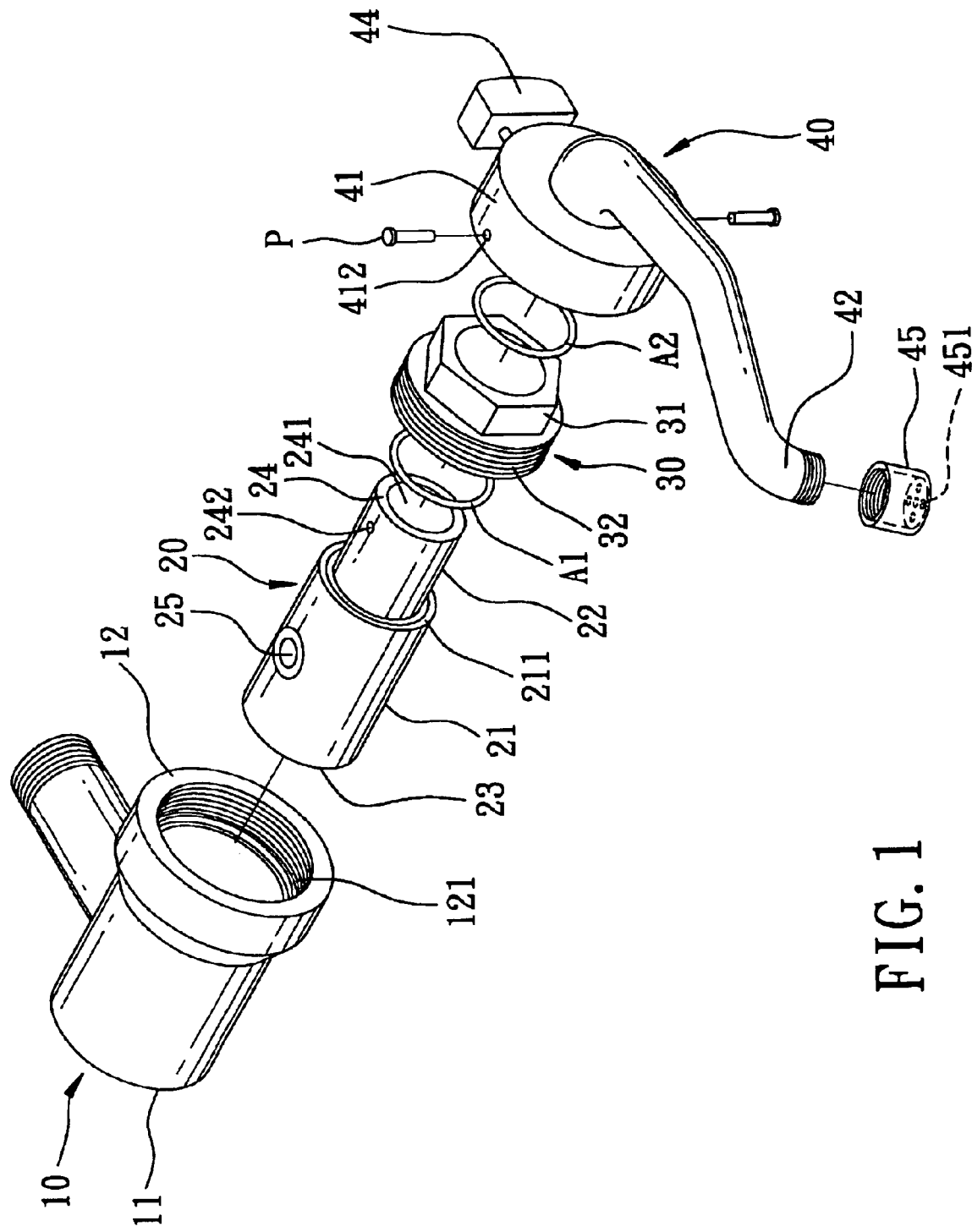
FIG. 1 is an exploded perspective view of the preferred embodiment of a faucet according to this invention.
Figure 2:
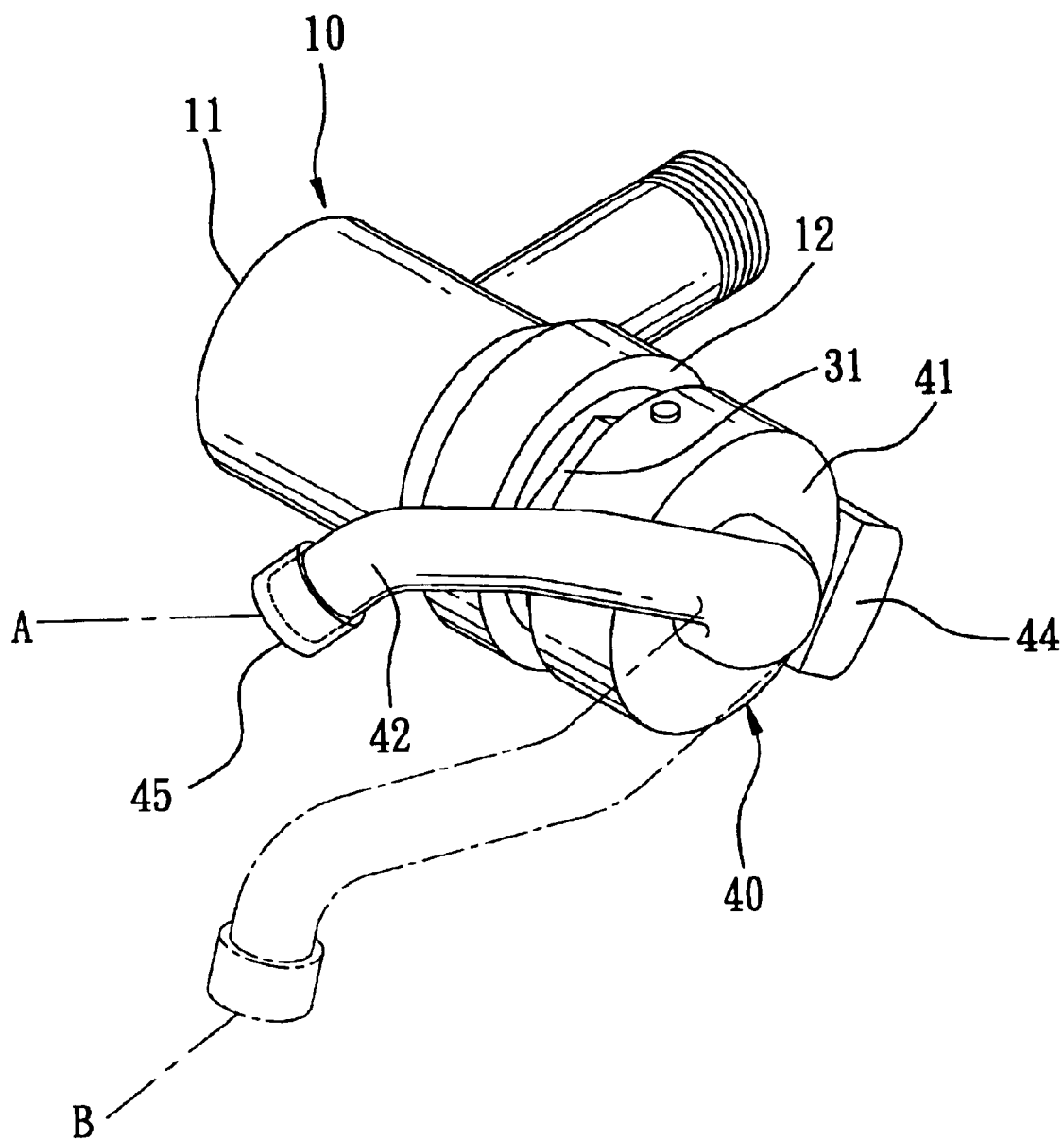
FIG. 2 is an assembled perspective view of the preferred embodiment, illustrating how a discharge spout is rotated between a discharging position and a non-discharging position.
Figure 3:
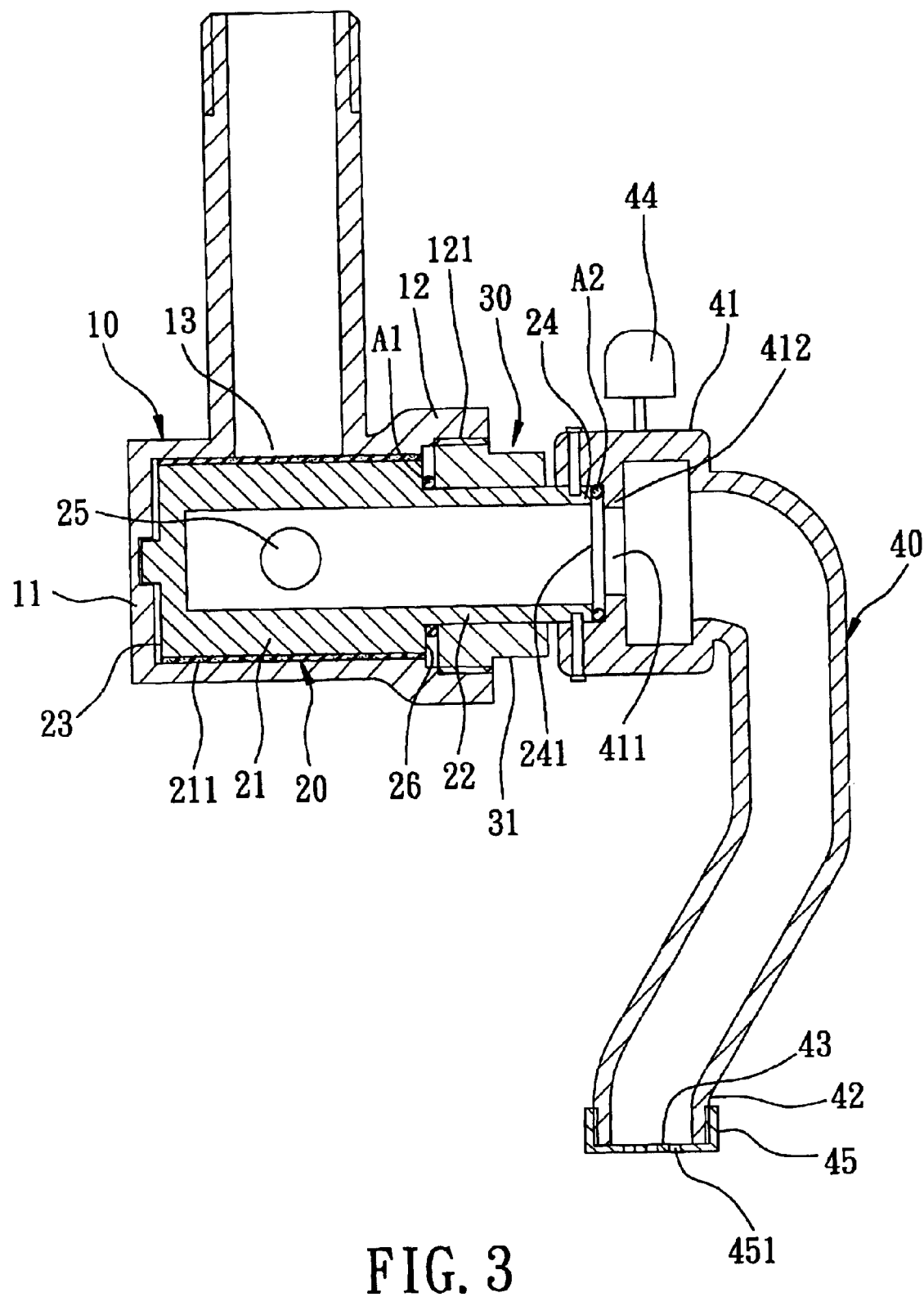
FIG. 3 is a sectional view of the preferred embodiment, illustrating how a valve tube is disposed at a close position so that the spout is disposed at the non-discharging position.

Referring to FIGS. 1, 2, and 3, the preferred embodiment of a faucet according to this invention is shown to include a T-shaped hollow faucet body 10, a valve tube 20, a retaining member 30, and a discharge spout 40.

The faucet body 10 includes a closed end 11, an open end 12 opposite to the closed end 11 and having an internal thread 121, and a water inlet 13 disposed between the closed end 11 and the open end 12 so that water can be introduced from a water source (not shown) into the faucet body 10 through the water inlet 13.

The valve tube 20 is journalled within the faucet body 10, and includes a large-diameter tube portion 21, a small-diameter tube portion 22, a closed end 23 adjacent to the closed end 11 of the faucet body 10, an open end 24 extending outwardly of the open end 12 of the faucet body 10, a central hole 241 formed through the valve tube 20, and an opening 25 disposed between the closed end 23 and the open end 24. The small-diameter tube portion 22 is formed integrally with the large-diameter tube portion 21, and has an outer diameter smaller than that of the large-diameter tube portion 21 so as to define a shoulder 26 between the large-diameter tube portion 21 and the small-diameter tube portion 22.

Figure 4:
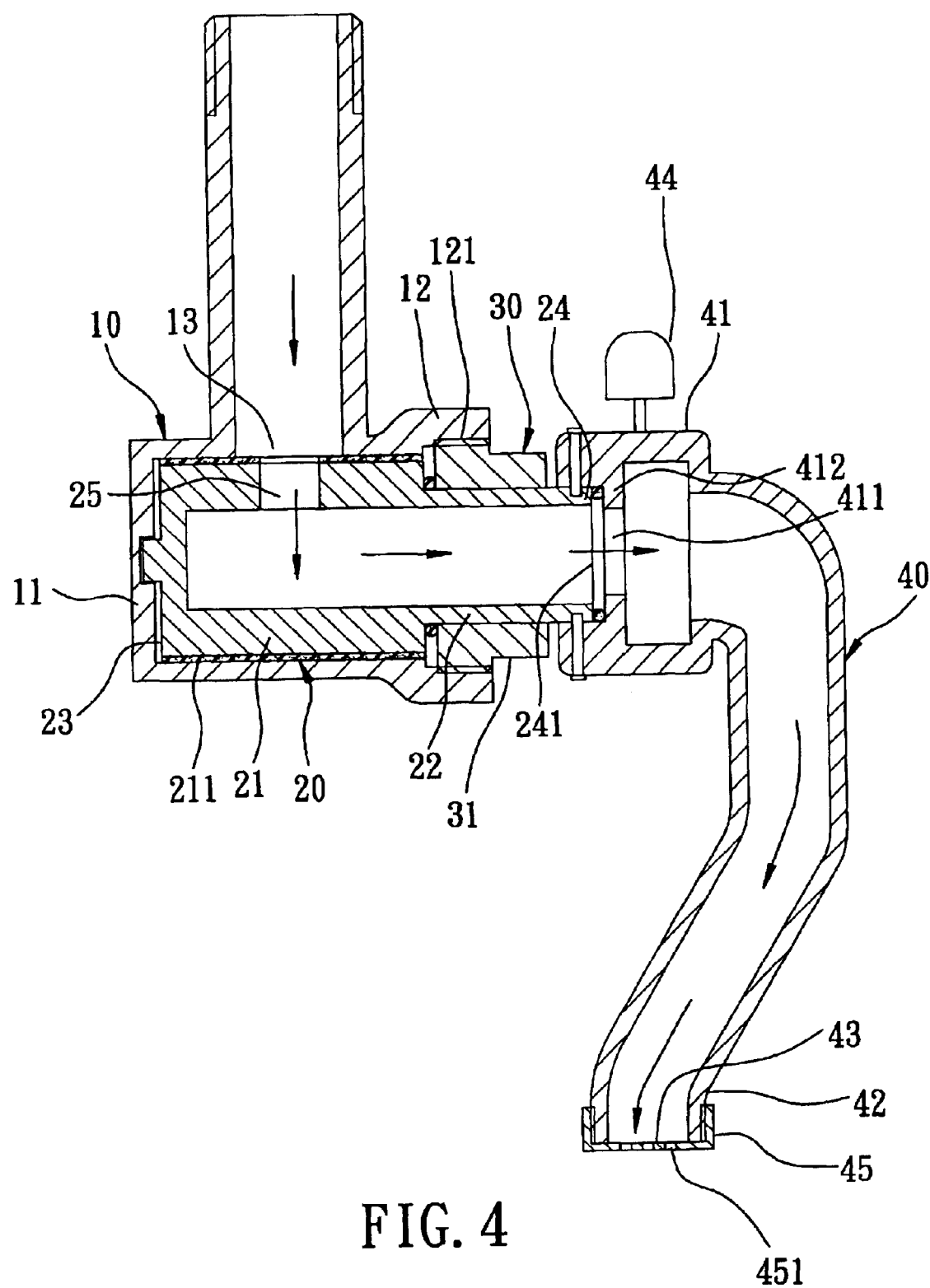
FIG. 4 is a sectional view of the preferred embodiment, illustrating how the valve tube is disposed at an open position so that the spout is disposed at the discharging position.

The valve tube 20 is rotatable within the faucet body 10 to a close position shown FIG. 3, where the opening 25 in the valve tube 20 is not fluidly communicated with the water inlet 13 in the faucet body 10 so as to prevent flow of water therethrough, and an open position shown in FIG. 4, where the opening 25 in the valve tube 20 comes into alignment with the water inlet 13 in the faucet body 10 so as to allow maximum flow of water therethrough. A tubular rubber spacer 211 is sleeved around the valve tube 20, is disposed within the faucet body 10, and is in frictional contact with the faucet body 10 and the valve tube 20 such that the valve tube 20 can be retained at the close and open positions and such that a liquid-tight seal is established between the valve tube 20 and the faucet body 10.

The retaining member 30 is tubular, is sleeved on the small-diameter tube portion 22 of the valve tube 20, is adjacent to the shoulder 26 of the valve tube 20, and has an inner diameter smaller than the outer diameter of the large-diameter tube portion 21 of the valve tube 20, a hexagonal end 31, and an externally threaded end 32 engaging threadably the open end 12 of the faucet body 10 so as to permit rotation of the valve tube 20 within the faucet body 10 and so as to prevent movement of the valve tube within the faucet body 10.

The spout 40 includes an open coupling end 41 connected fixedly to and in fluid communication with the open end 24 of the valve tube 20, and an open discharge end 42 having an end surface that is formed with a water outlet 43 (see FIG. 3). The coupling end 41 of the spout 40 is shaped as a sleeve, is disposed around the open end 24 of the valve tube 20, and has an inlet 411 in fluid communication with the central hole 241 in the valve tube 20. Each of the open end 24 of the valve tube 20 and the coupling end 41 of the spout 40 is formed with two pin holes 242, 412. The spout 40 further includes two lock pins (P), each of which extends through a respective one of the pin holes 412 in the spout 40 and into a respective one of the pin holes 242 in the valve tube 20 so as to interconnect the spout 40 and the valve tube 20 fixedly.

The spout 40 is rotatable about the valve tube 20 to a non-discharging position (A) (see FIGS. 2, 5, and 6), where the valve tube 20 is disposed at the close position shown in FIG. 3 so as to prevent flow of water from the discharge end 42 of the spout 40, and a discharging position (B) (see FIGS. 2, 5, and 6), where the valve tube 20 is disposed at the open position shown in FIG. 4, where a maximum amount of water can be discharged downwardly from the spout 40, and where the discharge end 42 can be pushed upwardly to turn the spout 40 to the non-discharging position (A). As such, the spout 40 serves as a valve lever.

A counterweight 44 is connected fixedly to the coupling end 41 of the spout 40 such that balance of the spout 40 can be maintained when the spout 40 is disposed at either of the non-discharging position (A) and the discharging position (B).

The spout 40 further includes a hollow cylindrical spray head 45 that is connected threadedly to the discharging end 41 of the spout 40 and that is formed with a porous end wall 451.

A first O-ring (A1) is sleeved around the small-diameter tube portion 22 of the valve tube 20, and is clamped between the shoulder 26 and the retaining member 30. A second O-ring (A2) is disposed in the coupling end 41 of the spout 40, and is clamped between the valve tube 20 and a radially and inwardly extending flange 412 of the spout 40 such that a liquid-tight seal is established therebetween.

Figure 5:
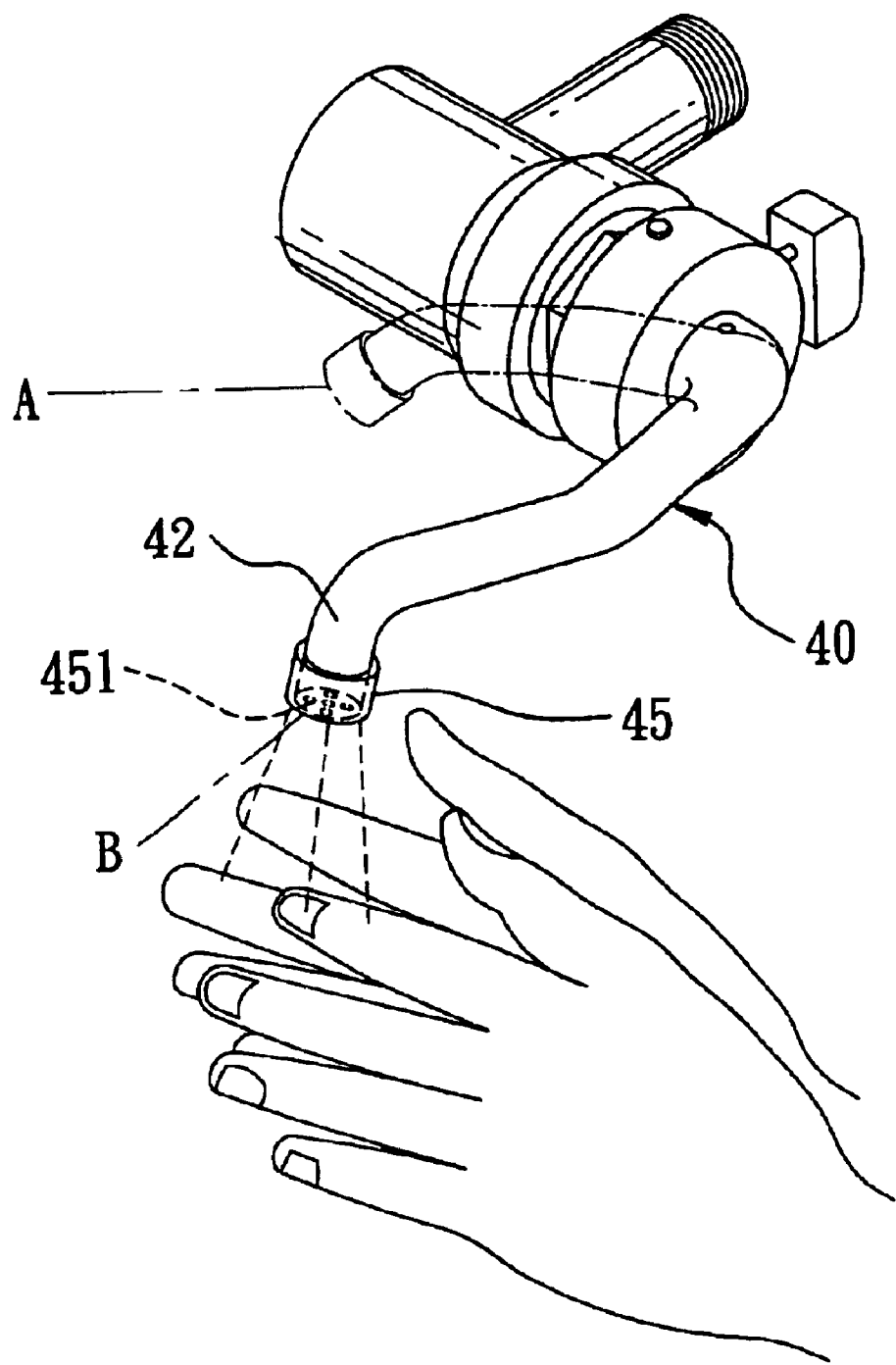
FIG. 5 is a perspective view of the preferred embodiment, illustrating how water is sprayed downwardly from the spout to wash the hands of a user.

Referring to FIG. 5, when the spout 40 is moved to the discharging position (B), the user can wash his/her hands under the spray head 45.

Figure 6:
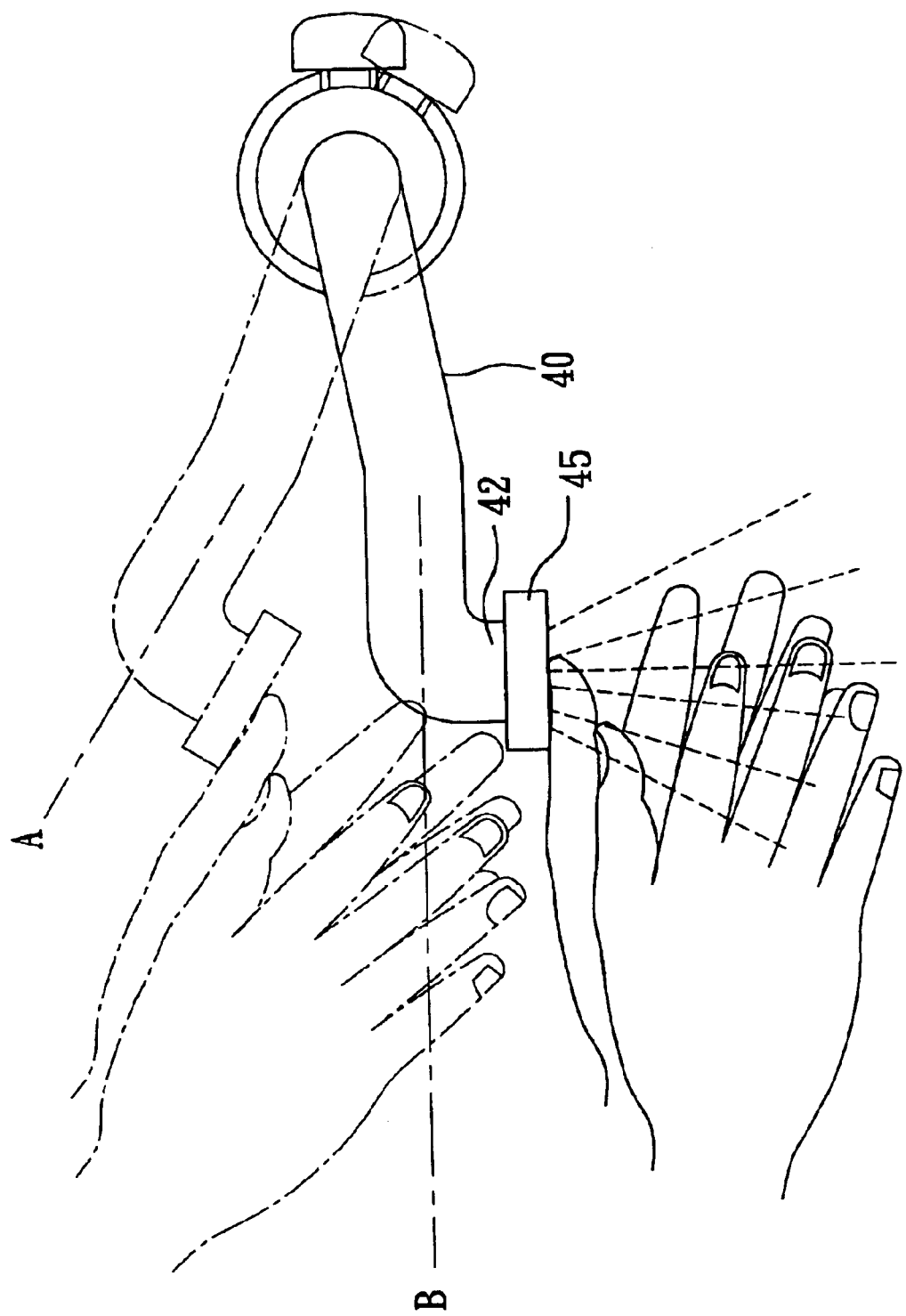
FIG. 6 is a side view of the preferred embodiment, illustrating how the spout is rotated from the discharging position to the non-discharging position.

Referring to FIG. 6, after washing, the user can push the spray head 45 upwardly with a thumb of one hand to turn the spout 40 to the non-discharging position (A). When the spout 40 is being turned upward from the discharging position (B) to the non-discharging position (A), water flow from the water inlet 13 through the opening 25 diminishes gradually so that there is still some water flowing out of the spray head 45 onto the thumb. As such, contamination of the hands of the user after washing due to contact with the spray head 45 can be prevented. The object of this invention can be therefore achieved.

With this invention thus explained, it is apparent that numerous modifications and variations can be made without departing from the scope and spirit of this invention. It is therefore intended that this invention be limited only as indicated by the appended claims.

I claim:

1. A faucet comprising:
    a faucet body including a closed end, an open end opposite to said closed end of said faucet body, and a water inlet disposed between said closed end and said open end of said faucet body so that water can be introduced into said faucet body through said water inlet;
    a valve tube journalled within said faucet body such that a liquid-tight seal is established therebetween and including a closed end adjacent to said closed end of said faucet body, an open end extending outwardly of said open end of said faucet body, and an opening disposed between said closed end and said open end of said valve tube, said valve tube being rotatable within said faucet body to a close position, where said opening in said valve tube is not fluidly communicated with said water inlet in said faucet body so as to prevent flow of water therethrough, and an open position, where said opening in said valve tube comes into alignment with said water inlet in said faucet body so as to allow maximum flow of water therethrough;
    a retaining member interconnecting said open ends of said valve tube and said faucet body so as to permit rotation of said valve tube within said faucet body and so as to prevent movement of said valve tube within said faucet body;
    a discharge spout including an open coupling end connected fixedly to and in fluid communication with said open end of said valve tube, and an open discharge end having an end surface that is formed with a water outlet, said discharge spout being rotatable about said valve tube to a non-discharging position, where said valve tube is disposed at said close position, and a discharging position, where said valve tube is disposed at said open position so that a maximum amount of water can be discharged downwardly from said discharge spout and where said discharge end can be pushed upwardly to turn said spout to said non-discharging position; and
    said spout further includes a counterweight connected fixedly to said coupling end such that balance of said spout can be maintained when said spout is disposed at either of said non-discharging position and said discharging position.

2. A faucet comprising:
    a faucet body including a closed end, an internally threaded open end opposite to said closed end of said faucet body, and a water inlet disposed between said closed end and said open end of said faucet body so that water can be introduced into said faucet body through said water inlet;
    a valve tube journalled within said faucet body such that a liquid-tight seal is established therebetween and including a closed end adjacent to said closed end of said faucet body, an open end extending outwardly of said open end of said faucet body, and an opening disposed between said closed end and said open end of said valve tube, said valve tube being rotatable within said faucet body to a close position, where said opening in said valve tube is not fluidly communicated with said water inlet in said faucet body so as to prevent flow of water therethrough, and an open position, where said opening in said valve tube comes into alignment with said water inlet in said faucet body so as to allow maximum flow of water therethrough;
    said valve tube includes a large-diameter tube portion and a small-diameter tube portion formed integrally with said large-diameter tube portion and having an outer diameter smaller than that of said large-diameter tube portion so as to define a shoulder between said large-diameter tube portion and said small-diameter tube portion; and
    a retaining member interconnecting said open ends of said valve tube and said faucet body so as to permit rotation of said valve tube within said faucet body and so as to prevent movement of said valve tube within said faucet body; said retaining member is tubular, is sleeved on said small-diameter tube portion of said valve tube, is adjacent to said shoulder of said valve tube, and has an inner diameter smaller than the outer diameter of said large-diameter tube portion of said valve tube, a hexagonal end, and an externally threaded end that engages threadably said open end of said faucet body.

3. The faucet as claimed in claim 2, wherein said coupling end of said spout is shaped as a sleeve, and is disposed around said open end of said valve tube, each of said open end of said valve tube and said coupling end of said spout being formed with two pin holes, said spout further including two lock pins, each of which extends through a respective one of said pin holes in said spout and into a respective one of said pin holes in said valve tube so as to interconnect said spout and said valve tube fixedly; and a discharge spout including an open coupling end connected fixedly to and in fluid communication with said open end of said valve tube, and an open discharge end having an end surface that is formed with a water outlet, said discharge spout being rotatable about said valve tube to a non-discharging position, where said valve tube is disposed at said close position, and a discharging position, where said valve tube is disposed at said open position so that a maximum amount of water can be discharged downwardly from said discharge spout and where said discharge end can be pushed upwardly to turn said spout to said non-discharging position.

4. A faucet comprising:

a faucet body including a closed end, an open end opposite to said closed end of said faucet body, and a water inlet disposed between said closed end and said open end of said faucet body so that water can be introduced into said faucet body through said water inlet;

a valve tube journalled within said faucet body such that a liquid-tight seal is established therebetween and including a closed end adjacent to said closed end of said faucet body, an open end extending outwardly of said open end of said faucet body, and an opening disposed between said closed end and said open end of said valve tube, said valve tube being rotatable within said faucet body to a close position, where said opening in said valve tube is not fluidly communicated with said water inlet in said faucet body so as to prevent flow of water therethrough, and an open position, where said opening in said valve tube comes into alignment with said water inlet in said faucet body so as to allow maximum flow of water therethrough;

a retaining member interconnecting said open ends of said valve tube and said faucet body so as to permit rotation of said valve tube within said faucet body and so as to prevent movement of said valve tube within said faucet body; and a discharge spout including an open coupling end connected fixedly to and in fluid communication with said open end of said valve tube, and an open discharge end having an end surface that is formed with a water outlet, said discharge spout being rotatable about said valve tube to a non-discharging position, where said valve tube is disposed at said close position, and a discharging position, where said valve tube is disposed at said open position so that a maximum amount of water can be discharged downwardly from said discharge spout and where said discharge end can be pushed upwardly to turn said spout to said non-discharging position;

a tubular rubber spacer that is sleeved around said valve tube and that is disposed within said faucet body, said spacer being in frictional contact with said faucet body and said valve tube such that said valve tube can be retained at said close and open positions.

5. The faucet as claimed in claim 1, wherein said spout further includes a hollow cylindrical spray head that is connected threadedly to said coupling end of said spout and that is formed with a porous end wall.

6. The faucet as claimed in claim 2, wherein said spout further includes a hollow cylindrical spray head that is connected threadedly to said coupling end of said spout and that is formed with a porous end wall.

7. The faucet as claimed in claim 4, wherein said spout further includes a hollow cylindrical spray head that is connected threadedly to said coupling end of said spout and that is formed with a porous end wall.

* * * * *